United States Patent [19]

Okanobu

[11] Patent Number: 4,639,659
[45] Date of Patent: Jan. 27, 1987

[54] DC-DC CONVERTER

[75] Inventor: Taiwa Okanobu, Tokyo, Japan

[73] Assignee: Sony Corporation, Tokyo, Japan

[21] Appl. No.: 842,252

[22] Filed: Mar. 21, 1986

[30] Foreign Application Priority Data

Apr. 5, 1985 [JP] Japan .................................. 60-72193

[51] Int. Cl.$^4$ ............................................... G05F 1/46
[52] U.S. Cl. ........................................ 323/224; 363/61
[58] Field of Search ......................... 363/20, 21, 61, 97; 323/224, 222

[56] References Cited

U.S. PATENT DOCUMENTS

| | | | |
|---|---|---|---|
| 3,356,926 | 12/1967 | Mason et al. ......................... | 363/61 |
| 4,459,537 | 7/1984 | McWhorter ......................... | 323/224 |
| 4,549,254 | 10/1985 | Kissel ................................... | 323/222 |
| 4,553,196 | 11/1985 | Tokuyama et al. .................... | 363/61 |

*Primary Examiner*—Peter S. Wong
*Assistant Examiner*—Judson H. Jones
*Attorney, Agent, or Firm*—Lewis H. Eslinger; Alvin Sinderbrand

[57] ABSTRACT

A DC-DC converter has an oscillation circuit, a voltage-multiplying rectifier circuit having a voltage source line as a reference potential point and being connected between an output of the oscillation circuit and an output terminal, a series circuit formed of a resistor and a diode connected between the voltage source line and the output terminal and a transistor whose collector-emitter path is connected between the connection point of the resistor to the diode in the series circuit and the ground. When an output voltage at the output terminal is required to be higher than a predetermined value, the oscillation circuit is made operative to provide an oscillation output which is rectified and multiplied by the rectifier circuit to thereby deliver the desired output voltage at the output terminal. When the output voltage is to be at a level lower than the predetermined value, the oscillation circuit is stopped and the voltage on the voltage source line is divided by the resistor and the transistor and thereby delivered to the output terminal as the desired lower level output voltage.

9 Claims, 3 Drawing Figures

DC-DC CONVERTER

BACKGROUND OF THE INVENTION

1. Field of the Invention

This invention relates generally to a DC-DC converter, and more particularly is directed to a DC-DC converter suitable for use with a radio receiver which is operable by a battery.

2. Description of the Prior Art

In a radio receiver of the electronic tuning type, that is, a receiver having a tuning circuit which includes a varicap diode and in which channel selection is carried out by varying a voltage supplied to the varicap diode, the channel selection voltage must be varied over a suitable range, for example, from 0.5 to 4.5 V. When the receiver is operated by a 3 V or 6 V battery, and in consideration of the fact that the battery is progressively consumed, the channel selection voltage is provided by a DC-DC converter.

Various types of DC-DC converters are known, for example, a ringing choke type converter (RCC) as shown in FIG. 1, and an oscillation transformer type as shown in FIG. 2. In the ringing choke type converter shown in FIG. 1, a transistor Qa is switched on or off by a PWM (pulse width modulation) pulse from a PWM modulator circuit 11 to thereby deliver an output voltage to a terminal Ta. This output voltage is supplied to a voltage comparator circuit 12 in which it is compared with a variable reference voltage Er. The duty ratio of the PWM pulse from modulator circuit 11 is controlled by the compared output from voltage comparator circuit 12 so as to make constant the output voltage at terminal Ta. The constant output voltage at terminal Ta is changed by changing the reference voltage Er.

In the oscillation transformer type converter shown in FIG. 2, an oscillation is carried out by a resonance frequency between a transformer Ma and a capacitor Ca to develop an output voltage at a terminal Ta and the peak level or magnitude of an oscillation from an oscillation circuit 13 is controlled by a compared output from a comparator circuit 12, whereby the output voltage at the terminal Ta is made constant. In this case, the output voltage at terminal Ta may be changed by adjusting a variable resistor Ra having a movable tap to which terminal Ta is connected.

Since the converter shown in FIG. 1 is of a switching type, it generates a large noise which will badly disturb the receiver. Accordingly, it is not suitable to provide the channel selection voltage for the varicap diode by means of this switching type converter.

If the converter shown in FIG. 2 is not provided with the variable resistor Ra, the output voltage is controlled by varying the oscillation level or magnitude of circuit 13. In this case, it is difficult to stably control the oscillation level or magnitude over a wide range for achieving a corresponding wide range of channel selection voltages. Particularly when the output voltage is made low, the oscillation is stopped. To this end, and as shown in FIG. 2, the oscillation level or magnitude is made constant, and the desired output voltage is obtained by using the variable resistor Ra. However, with this latter circuit arrangement, even when the output voltage is to be at a minimum, the oscillation circuit 13 must keep the oscillation at an oscillation level or magnitude corresponding to that required for the maximum output voltage with the result that the conversion efficiency of the DC-DC converter is lowered. Of course, this is not desirable for a receiver which is operated by battery.

OBJECTS AND SUMMARY OF THE INVENTION

Accordingly, it is an object of the present invention to provide an improved DC-DC converter which avoids the mentioned disadvantages of the prior art.

More specifically, it is an object of the present invention to provide a DC-DC converter which can freely vary an output voltage over a wide range that extends both above and below a power source voltage.

It is another object of the present invention to provide a DC-DC converter whose power consumption is quite small.

It is a further object of the present invention to provide a DC-DC converter which is suitable for use with a radio receiver operable by a battery.

According to one aspect of the present invention, there is provided a DC-DC converter comprising: a voltage-multiplying rectifier circuit having a voltage source line to which a power source voltage is supplied as a reference potential point and an output terminal connected to its output side; a series circuit formed of a resistor and a diode and being connected between the voltage source line and the output terminal; voltage dividing means connected between a connection point of said resistor to said diode in said series circuit and a ground; and an oscillation circuit connected at its output side with said voltage-multiplying rectifier circuit, wherein, when said oscillation circuit is in an oscillation state, an oscillation output thereof is rectified and multiplied by said voltage-multiplying rectifier circuit to thereby develop an output voltage higher than said power source voltage at said output terminal, whereas, when said oscillation circuit is in a stop state, said power source voltage is divided by said voltage dividing means to thereby obtain a voltage lower than said power source voltage at said output terminal.

The above, and other objects, features and advantages of the present invention, will become apparent from the following detailed description of a preferred embodiment thereof which is to be read in conjunction with the accompanying drawings.

DESCRIPTION OF THE PREFERRED EMBODIMENT

Figure 1:
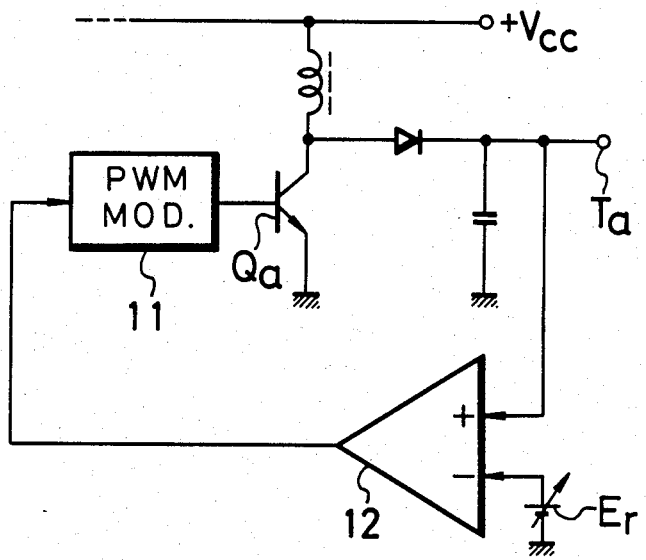
FIGS. 1 and 2 are schematic diagrams showing respective prior art DC-DC converters.
Figure 2:
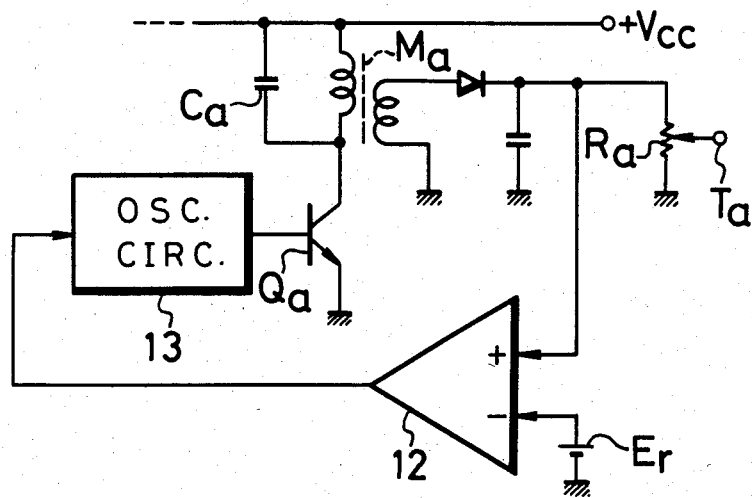

An embodiment of a DC-DC converter according to the present invention will now be described in detail with reference to FIG. 3, in which reference numeral 1 generally designates an oscillation circuit. Oscillation circuit 1 is shown to include transistors Q1 and Q2 whose emitters are connected together to a collector of a transistor Q3 which is used as a constant current source to thereby form a differential amplifier. A positive feedback is carried out to the oscillation circuit 1 by capacitors C1 and C2, and thus circuit 1 oscillates at an oscillation frequency determined by a coil L1 and a stray capacity. A constant voltage source Vr serves as both a bias voltage source and a reference voltage source. From this constant voltage source Vr, the base bias is supplied through a resistor R1 to the base of transistor Q1 and directly to the base of transistor Q2.

Figure 3:
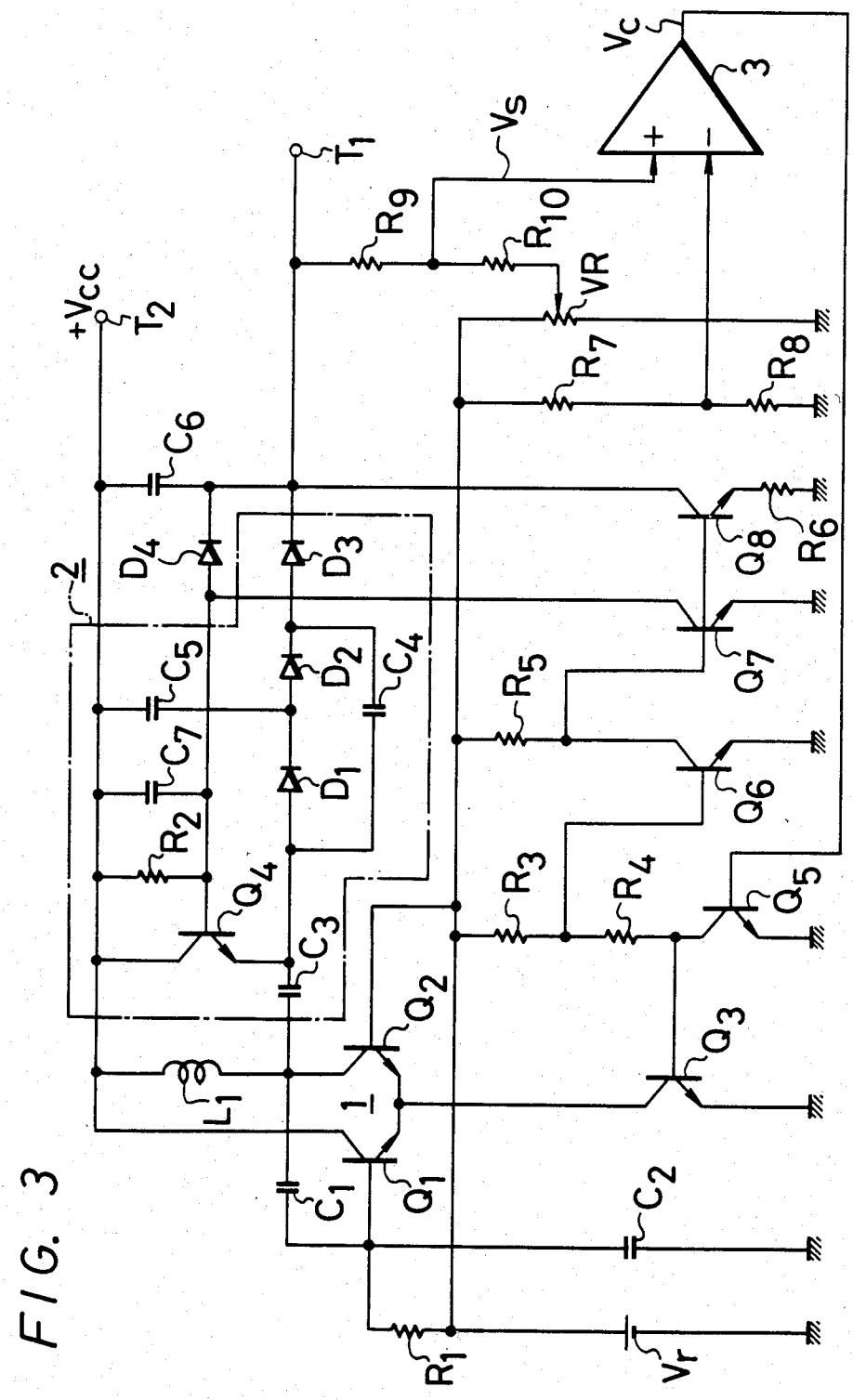
FIG. 3 is a connection diagram showing an embodiment of a DC-DC converter according to the present invention.

The DC-DC converter of FIG. 3 further comprises a voltage-multiplying rectifier circuit 2 which is interposed between the collector of transistor Q2 and an output terminal T1, and which includes a capacitor C3 and diodes D1, D2 and D3 connected in series. A capacitor C4 is connected in parallel to the series circuit formed of diodes D1 and D2. The collector-emitter path of a transistor Q4 is connected between a voltage source terminal T2 and the connection point of capacitor C3 to diode D1. A capacitor C5 is connected between terminal T2 and the connection point between diodes D1 and D2. A resistor R2 and a capacitor C7 are each connected between terminal T2 and the base of transistor Q4. A diode D4 is connected between the base of transistor Q4 and the diode D3, and a capacitor C6 is connected between terminal T1 and T2. It will be appreciated that, resistor R2 and diode D4 are, in effect, connected in series between voltage source terminal T2 and output terminal T1.

Further, resistors R7 and R8 are connected in series to voltage source Vr. A voltage generated at the connection point between resistor R7 and R8 is supplied to an inverting input terminal of a voltage comparing circuit 3. A potentiometer or variable resistor VR is connected to voltage source Vr, and resistors R9 and R10 are connected in series between terminal T1 and the sliding contact or tap of variable resistor VR. A voltage Vs generated at the connection point between resistors R9 and R10 is supplied to a non-inverting input terminal of voltage comparing circuit 3.

Resistors R3 and R4 and a collector-emitter path of a transistor Q5 are connected in series to voltage source Vr. A compared output Vc from voltage comparing circuit 3 is supplied to the base of transistor Q5 which has its collector further connected to the base of transistor Q3. The connection point between resistor R3 and R4 is connected to a base of a transistor Q6 which has its collector connected via a resistor R5 to voltage source Vr. The collector of transistor Q6 is further connected to bases of transistors Q7 and Q8. The collector of transistor Q7 is connected to the base of transistor Q4, that is, to the connection point between resistor R2 and diode D4, and the collector of transistor Q8 is connected to Terminal T1. Finally, a resistor R6 is connected between the emitter of transistor Q8 and ground.

The DC-DC converter according to this invention, as described with reference to FIG. 3, operates as follows:

When the sliding contact of variable resistor VR is placed at a position near to, or at the ground side of its resistance element, a high output voltage is generated at the terminal T1. More specifically, in this case, since the voltage Vs is relatively low, the compared output Vc applied to the base of transistor Q5 is also low so that the impedance of transistor Q5 is large. Accordingly, a large base bias is applied to transistor Q3 and a relatively large current flows through transistor Q3. Since the collector current is large, oscillation circuit 1 oscillates and the peak oscillation level or magnitude thereof is relatively large.

At that time, since the base bias of transistor Q6 is higher than that of transistor Q3 by the amount of the voltage drop across resistor R4, transistor Q6 tends to turn on more easily than transistor Q3. As a result, transistors Q7 and Q8 are turned off. Since transistor Q7 is turned off, the base of transistor Q4 is biased via resistor R2, so that transistor Q4 is turned on and is operated as a diode. Also, since transistor Q8 is turned off, circuit 2 acts as a voltage-multiplying rectifier circuit, that is, it provides a rectified DC voltage which is four times the peak voltage of the oscillation output of circuit 1.

Such rectified output from circuit 2 is delivered to terminal T1. At such time, rectifier circuit 2 takes the voltage Vcc at terminal T2 as its reference potential point so that the output voltage developed at terminal T1 has the value which results from adding the voltage Vcc at terminal T2 to the voltage-multiplied rectified output of circuit 2.

When the sliding contact of variable resistor VR is moved toward the hot side by a predetermined amount from the ground side, voltage Vs is increased by the value corresponding to such predetermined amount of movement and hence the compared output Vc of the comparing circuit 3 is also increased. Thus, the impedance of transistor Q5 is lowered and the collector current of transistor Q3 is decreased. As a result, the oscillation level or magnitude of oscillation circuit 1, and the 4-multiply, rectified output from circuit 2 are decreased. Thus, the output voltage at terminal T1 is lowered by the amount corresponding to the amount of the movement of the sliding contact of variable resistor VR.

As described above, if the sliding contact of variable resistor VR is adjusted along the portion of the resistance connected to ground, the oscillation level or peak magnitude of the output of oscillation circuit 1 is changed, whereby the output voltage at the terminal T1 is changed in response thereto.

If, while the sliding contact of variable resistor VR is disposed at a constant position, the output voltage at terminal T1 fluctuates, for example, is lowered, the compared output Vc is also lowered so that the impedance of transistor Q5 is increased and the collector current of the transistor Q3 is increased. Thus, the oscillation level or peak magnitude of the oscillation output of oscillation circuit 1 is increased to thereby prevent the output voltage at the terminal T1 from being lowered. Thus, if the output voltage at terminal T1 is fluctuated, the amount of such fluctuation is negatively fed back to oscillation circuit 1 by which the oscillation level or magnitude thereof is suitably varied or compensated. As a result, the output voltage at terminal T1 is stabilized so as to become a constant adjusted value.

However, when the sliding contact of the variable resistor VR is further moved toward the hot side, that is, the sliding contact nears the hot side end of the resistance, the voltage Vs is further increased and the compared output Vc becomes sufficiently high so that the impedance of the transistor Q5 is lowered to the point where transistor Q3 is turned off and the oscillation of oscillation circuit 1 is stopped.

Moreover, at that time, since the impedance of the transistor Q5 is further decreased, the impedance of the transistor Q6 becomes large to increase the base bias of transistors Q7 and Q8. Thus, the transistors Q7 and Q8 are placed in a predetermined impedance state other than the off-state. As a result of the foregoing, the voltage Vcc at terminal T2 is delivered through resistor R2 and diode D4 in series to terminal T1 and, at the same time, this output voltage is divided by transistors Q7 and Q8 and resistor R6.

Accordingly, when the sliding contact of variable resistor VR is adjusted along the hot side portion of the resistance with transistors Q7 and Q8 in other than the off-state, the compared output Vc is varied in accordance with such adjustment and the impedance of transistor Q5 is changed, whereby the impedance of transistor Q6 and hence the impedances of transistor Q7 and Q8 are changed, with the result that, the low level output voltage at terminal T1 is adjusted.

In other words, when the sliding contact of variable resistor VR is adjusted along the hot side portion of the resistance, the voltage-dividing ratio for the power source voltage Vcc is varied and the output voltage at the terminal T1 is varied in response thereto.

However, when the sliding contact of variable resistor VR is disposed at a predetermined position along the hot side portion of the resistance, if the output voltage at terminal T1 fluctuates, this changed amount or fluctuation appears as a change of the compared output Vc and is negatively fed back to transistors Q7 and Q8 so that the output voltage at terminal T1 is stabilized so as to become a constant adjusted value.

If the operation points of transistors Q3 to Q8 are suitable selected, when the output voltage at terminal T1 is higher than the power source voltage Vcc at terminal T2, oscillation circuit 1 will oscillate. The oscillation output is rectified and its peak voltage is multiplied by 4 in circuit 2 and then delivered to output T1. On the other hand, when the output voltage at terminal T1 is lower than the power source voltage Vcc, the oscillation of oscillation circuit 1 is stopped, and the power source voltage Vcc is divided and then delivered to terminal T1. At that time, since the output voltage is derived via diode D4, the circuit elements Q4 and D1 to D3 are turned off so that it is possible to remove the instability at the changeover point between the operation to derive the output voltage by the 4-multiple-rectifying of the oscillation output and the operation to derive the output voltage by dividing the power source voltage Vcc.

When the output voltage at terminal T1 is lower than the voltage of the voltage source Vr, transistor Q8 operates as a by-pass route to ground for current flowing through resistors R10 and R9 so that it is possible to set the output voltage near zero Volts.

According to the present invention as described above, when an output voltage higher than the power source voltage Vcc is required, oscillation circuit 1 is oscillated and the output voltage is provided by 4-multiple-rectifying the oscillation output; and, when an output voltage lower than the power source voltage Vcc is required, the oscillation of oscillation circuit 1 is stopped and the output voltage is provided by dividing the power source voltage Vcc. Therefore, it is possible to change the output voltage over a wide range from a high voltage to a low voltage. Since the oscillation of oscillation circuit 1 is stopped when the required output voltage is lower than the power source voltage Vcc, the current consumption is small. Thus, a DC-DC converter according to the present invention is suitable for use in a receiver operated by a battery.

When the output voltage is low, the output voltage is derived via diode D4 so that transistor Q4 and the diodes D1 to D3 are turned off. Consequently, it is possible to smoothly change between the operation in which a high output voltage is generated by 4-multiple-rectifying the oscillation output and the operation in which a low output voltage is generated by dividing the power source voltage Vcc.

Since, in the DC-DC converter according to the present invention, no switching operation is required and oscillation circuit 1 is of the balanced type, little noise is generated. Hence, disturbance of the radio receiver by such noise and the like is prevented.

Although a single preferred embodiment of the invention has been described above with reference to the accompanying drawings, it will be apparent that the invention is not limited to that precise embodiment and that many modifications and variations could be effected therein by one skilled in the art without departing from the spirit or scope of the invention as defined in the appended claims.

What is claimed is:

1. A DC-DC converter comprising:
    oscillation circuit means having an oscillating state in which an oscillation output is provided and a stop state;
    an output terminal;
    a voltage source line for receiving a power source voltage;
    voltage-multiplying rectifier means receiving said power source voltage from said voltage source line and connected to said oscillation circuit means to receive said oscillation output in said oscillating state and to then generate a rectified output having a voltage which is at least two times the peak voltage of said oscillation output and which is superposed on said power source voltage to provide an output voltage at said output terminal which is higher than said power source voltage;
    a series circuit formed of a resistor and a diode and being connected between said voltage source line and said output terminal; and
    voltage dividing means connected between a connection point of said resistor to said diode in said series circuit and a ground so that, in said stop state of said oscillation circuit means, said power source voltage is divided by said voltage dividing means for obtaining an output voltage at said said output terminal which is lower than said power source voltage.

2. A DC-DC converter according to claim 1; further comprising means for varying the peak voltage of said oscillation output and thereby adjusting the value of said output voltage in said oscillating state of said oscillation circuit means.

3. A DC-DC converter according to claim 2; further comprising means responsive to fluctuations of said output voltage from an adjusted value thereof for varying said peak voltage of said oscillation output in the sense to maintain said adjusted value of the output voltage at said output terminal.

4. A DC-DC converter according to claim 2; in which said oscillation circuit means includes first and second transistors connected with a third transistor as a constant current source to form a differential amplifier, and positive feedback means; and said means for varying the peak voltage of said oscillation output includes means for varying a base bias of said third transistor.

5. A DC-DC converter according to claim 4; in which said means for varying a base bias of said third transistor includes a reference voltage source, a bias control transistor connected with said reference voltage source and with said third transistor for varying said base bias of the latter inversely in respect to a control voltage applied to a base of said bias control transistor, a voltage comparator having first and second inputs and providing a compared output as said control voltage for said bias control transistor, means connected with said reference voltage source for providing a constant voltage level at said first input, and means connected with said output terminal for providing to said second input a voltage which varies proportionally with said output voltage.

6. A DC-DC converter according to claim 5; in which said means for providing said voltage to the second input includes means for varying said second input voltage relative to said output voltage.

7. A DC-DC converter according to claim 5; in which said means for providing said second input voltage includes a variable resistor connected with said reference voltage source and having a slidable contact, a pair of resistors connected in series between said output terminal and said slidable contact, and means connecting a connection point between said pair of resistors with said second input so that said second input voltage is variable by displacement of said slidable contact.

8. A DC-DC converter according to claim 7; in which said third transistor is turned off to establish said stop state in response to a predetermined level of said compared output; and in which said voltage dividing means includes a pair of additional transistors having bases connected in common to be turned on upon said compared output attaining said predetermined level, one of said additional transistors has a collector-emitter path connected between said connection point in the series circuit and ground, the other of said additional transistors has a collector-emitter path connected between said output terminal and ground through a resistor in series therewith, and the impedances of said additional transistors are progressively decreased in response to increasing of said compared output beyond said predetermined level.

9. A DC-DC converter according to claim 5; in which said third transistor is turned off to establish said stop state in response to a predetermined level of said compared output; and in which said voltage dividing means includes a pair of additional transistors having bases connected in common to be turned on upon said compared output attaining said predetermined level, one of said additional transistors has a collector-emitter path connected between said connection point in the series circuit and ground, the other of said additional transistors has a collector-emitter path connected between said output terminal and ground through a resistor in series therewith, and the impedances of said additional transistors are progressively decreased in response to increasing of said compared output beyond said predetermined level.

* * * * *